United States Patent [19]
Levine

[11] 4,063,141
[45] Dec. 13, 1977

[54] LINEAR D.C. DRIVE CIRCUIT

[75] Inventor: Seymour Levine, Huntington, N.Y.

[73] Assignee: Sperry Rand Corporation, New York, N.Y.

[21] Appl. No.: 677,993

[22] Filed: Apr. 19, 1976

[51] Int. Cl.² .............................................. B64C 17/02
[52] U.S. Cl. .................................. 318/648; 318/599; 318/689; 74/5.47
[58] Field of Search ............... 318/648, 649, 599, 293, 318/341, 689; 74/5.47

[56] References Cited

U.S. PATENT DOCUMENTS

| | | | |
|---|---|---|---|
| 3,422,326 | 1/1969 | White et al. ..................... | 318/689 X |
| 3,525,029 | 8/1970 | Joslyn et al. ......................... | 318/599 |
| 3,870,940 | 3/1975 | Espen ............................... | 318/648 X |
| 3,883,788 | 5/1975 | Storey, Jr. ........................... | 318/648 |

*Primary Examiner*—B. Dobeck
*Attorney, Agent, or Firm*—Howard P. Terry; Joseph M. Roehl

[57] ABSTRACT

A d.c. load is energized through a full wave bridge circuit from an a.c. source in accordance with a d.c. control signal. The d.c. control signal is modulated so as to produce a train of unipolar pulses having pulse widths proportional to the magnitude of the d.c. control signal and synchronized so that the midpoints of successive pulses occur at the peaks of successive half cycles of the a.c. source voltage. A steering network couples the modulated width pulses to either a first or second transistor means in the bridge circuit depending upon the polarity of the d.c. control signal. The selected transistor means is saturated throughout the occurrence of an applied modulated width pulse and arranged so that energizing current is passed through the load in a forward or reverse direction, respectively, depending upon which of the transistor means is actuated.

6 Claims, 3 Drawing Figures

FIG.1.

NEGATIVE CONTROL VOLTAGE

POSITIVE CONTROL VOLTAGE

LINEAR D.C. DRIVE CIRCUIT

BACKGROUND OF THE INVENTION

1. Field of the Invention

The invention relates to precisely controllable electronic drive circuits and more specifically to electronic circuits for energizing a d.c. load from an a.c. source in proportion to the value of a d.c. control signal.

2. Description of the Prior Art

Situations arise wherein it is necessary to drive an electrical load from an a.c. source in proportion to the magnitude of a control signal.

In gyroscopic systems used aboard aircraft or marine vessels, for instance, two axes of gimbal freedom are often provided, which in the normal erect position of the gyroscope are orthogonal to each other and to the gyroscope rotor spin axis. When erect, the spin axis is parallel to the gravitational vector. However, when the gyroscope is to be started or when the spin axis otherwise becomes displaced from its normal position, the spin axis must be erected into a position parallel to the gravitational vector.

In general, such systems employ direct current torque motors mechanically coupled to the respective gimbal axes to provide erecting torques in response to a signal derived from means for sensing deviations of the spin axis. The sensing means frequently consists of an electrolytic vertical reference switch containing an electrolyte disposed between a mounting plate and a shell so as to form a bubble. Metallic detection plates contact the liquid, and as the gyroscope deviates from the erect position, the bubble moves so that the resistance of the device changes accordingly. Such a sensor is described, for instance, in U.S. Pat. No. 3,020,770, issued to W. W. Young et al on Feb. 13, 1962. A control signal is derived from the sensing means and applied to a torque motor drive circuit wherein it is converted to a signal suitable for driving the associated torque motor. Many prior art systems, such as the system described in the aforementioned U.S. Pat. No. 3,020,770, employ servomotors which require bulky and heavy inductive devices such as Scott-T transformer networks which limit their utility in situations where space and weight are at a premium.

Other systems are available which operate on a pulse principle. U.S. Pat. No. 3,604,276, issued to Charles Eliot Hurlburt on Sept. 14, 1971, for instance, includes a multivibrator for generating a rectangular pulse train. The pulse train is used to switch power to the torque motor in response to control signals from a sensor. The pulse system permits the gyroscope to be torqued at a rate greater than the normal erection rate, and prolongs switch life by limiting current through the switching means. Although the pulse repetition rate and pulse duration may be adjusted to match the characteristics of a given system, there is no suggestion of varying either of these parameters as a function of variations in the control signal, as contemplated in the present invention.

SUMMARY OF THE INVENTION

A reversible d.c. load is driven from an a.c. source through a full wave bridge circuit in response to a d.c. control signal. By converting the control signal into a train of variable width switching pulses which are synchronized with the peaks of the a.c. source signal and which have widths proportional to the magnitude of the control signal, and by using these pulses to switch energy from the source to the load throughout the duration of each pulse, the load can be driven directly proportional to the magnitude of the control signal. By steering the pulses to appropriate arms of a full wave bridge, the load can be driven in a forward or in a reverse manner in response to the polarity of the control signal. The circuit design provides a 100% linearity drive signal to the load circuit while maintaining the low power dissipation advantages of a switching drive circuit.

DESCRIPTION OF THE PREFERRED EMBODIMENT

Figure 1:
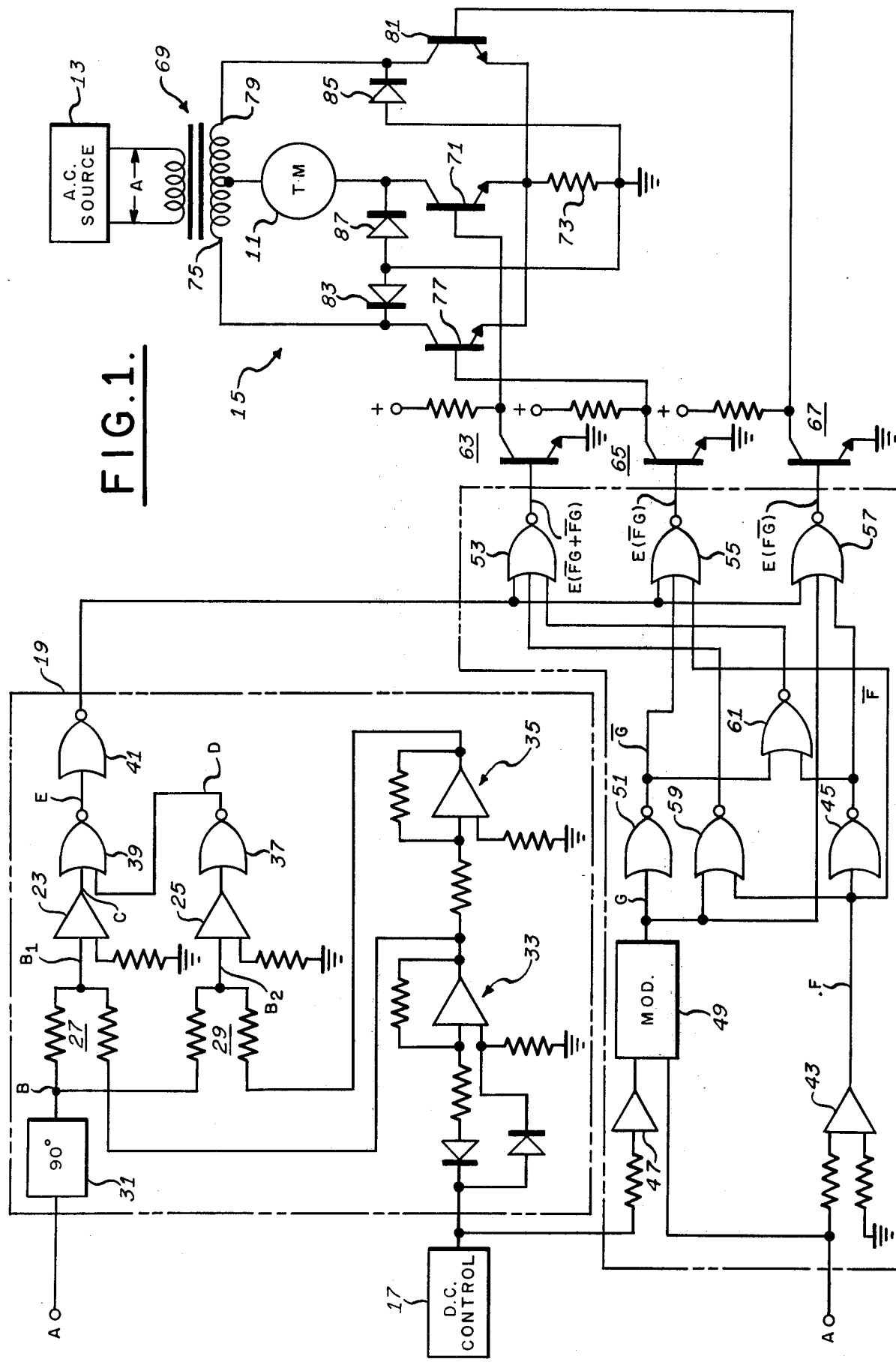
FIG. 1 is a diagram illustrating a circuit constructed in accordance with the principles of the invention and adapted for driving a d.c. torque motor.

FIG. 1 illustrates a circuit employing the principles of the invention and adapted to drive a d.c. torque motor TM 11 from an a.c. source 13 through a switching means in the form of a full wave bridge 15 as a function of the magnitude and polarity of a d.c. voltage derived from the d.c. control circuit 17. The d.c. control signal is applied to a pulse width modulating means 19 which produces a train of rectangular output pulses synchronized with the voltage from the alternating current source 13 and having widths proportional to the magnitude of the applied d.c. control signal. The d.c. control signal is also applied to a steering circuit 21 which directs the individual pulses to selected transistors in the bridge circuit 15 so as to drive the torque motor in the forward or reverse direction, respectively, in accordance with the polarity of the d.c. control signal.

Figure 2:
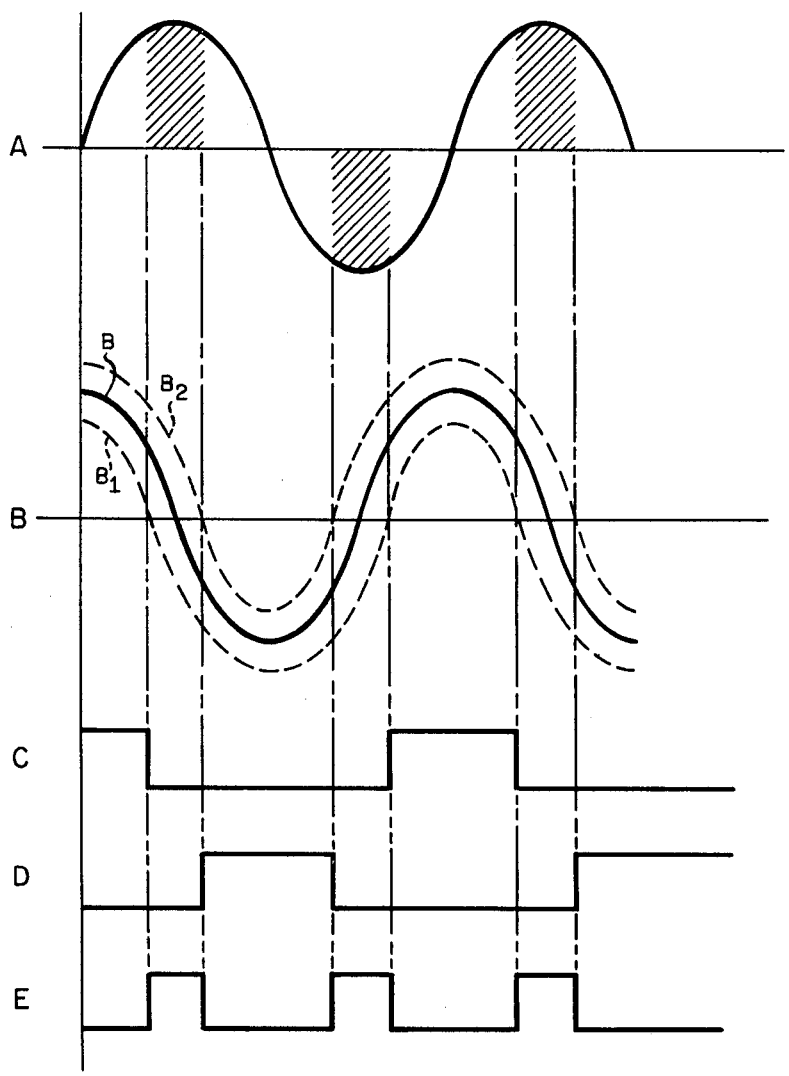
FIGS. 2 and 3 are graphs useful in explaining the operation of the invention.

The manner in which the pulse width modulating means 19 operates can be understood by referring to the graphs in FIG. 2 together with the circuit diagram of FIG. 1. The pulse width modulating means includes a pair of overdriven amplifiers 23 and 25 which are driven through the respective summing networks 27 and 29 to function as polarity responsive wave-squaring means. The output signal from the a.c. source 13, as represented by curve A of FIG. 2, is sampled and applied to the input of a 90° phase shifter 31 so as to produce a sinusoidal signal B in quadrature with the signal A from the a.c. source 13. The d.c. control signal is passed through an absolute value amplifier 33 to the summing network 27 and through a linear inverter 35 to the second summing network 29. Thus the summing networks produce first and second offset signals equal to the instantaneous sum and difference, respectively, of the quadrature and the d.c. control signals. The curves $B_1$ and $B_2$ of FIG. 2 depict the offset voltages applied to the amplifiers 23 and 25, respectively, when the d.c. control signal has a positive polarity.

For a d.c. control signal of the opposite polarity, the direction of offset of each of the waves $B_1$ and $B_2$ is reversed.

Each of the overdriven amplifiers 23 and 25 serves as a half-wave rectifying and squaring means so as to produce a d.c. pulse during the time that the signal applied to the amplifier has a specified polarity. Thus the amplifier 23 produces a train of rectangular pulses occurring throughout the time that the offset voltage $B_1$ is positive. The output voltage from the amplifier 25 is passed through an inverting gate 37 so as to produce a train of rectangular output pulses D each occurring during the time that the second offset voltage $B_2$ is negative.

The wave trains C and D constitute first and second gating voltages, respectively, which are applied to a NOR gating means 39 so as to produce individual output pulses, E, which exist throughout the time that both trains C and D are at a zero level. Thus, it can be seen that the wave E constitutes a train of variable duration d.c. voltage pulses whose pulse widths are determined by the value of the d.c. control signal.

It should be noted that the offset waves $B_1$ and $B_2$ are vertically displaced in equal and opposite directions by an amount determined by the magnitude of the d.c. control signals. By referring to FIG. 2, it may also be noted that variable duration d.c. voltage pulses exist throughout each interval wherein the offset waves $B_1$ and $B_2$ are of opposite polarity with respect to the zero axis of the quadrature signal. Furthermore, it should be noted that the variable duration d.c. voltage pulses are synchronized with the sinusoidal wave A so as to be symmetrical with respect to the voltage peaks of that wave as indicated by the shaded portions in curve A.

The variable duration d.c. voltage pulses are coupled to the steering circuit 21 through an output NOR gate 41.

Figure 3:
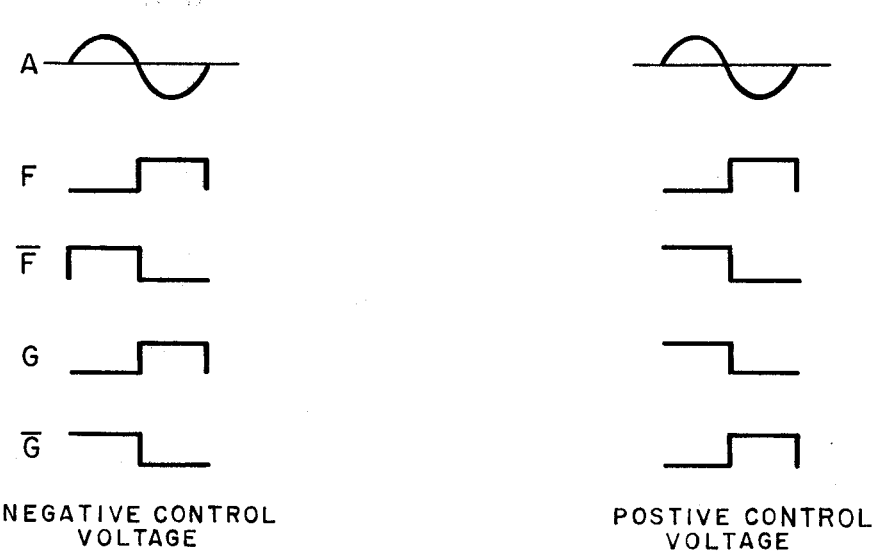

The steering circuit 21 functions to steer the individual variable duration d.c. voltage pulses to appropriate transistors in the bridge 15 so as to operate the torque motor in a forward or reverse direction in accordance with the polarity of the d.c. control signal. The operation of the steering circuit 21 can be understood by referring to the graphs in FIG. 3 in conjunction with the circuit diagram of FIG. 1.

The sinusoidal wave A from the source 13 is applied to an overdriven amplifier 43 in the steering circuit which produces a wave train F consisting of rectangular pulses existing during the second half of each cycle of the sinusoidal wave A. The wave train F is inverted in a NOR gate 45 so as to produce a wave train $\overline{F}$ consisting of pulses existing during the first half of each cycle of the sinusoidal wave A.

The d.c. control signal from the source 17 is applied through an overdriven amplifier 47 to a modulator 49 which is actuated by the wave train A. The overdriven amplifier 47 produces a d.c. voltage of constant amplitude in response to any control signal but having a polarity determined by the polarity of the control signal. The modulator 49 effectively chops this voltage so as to produce a rectangular pulse train G. As can be seen from FIG. 3, the position of the pulses in the wave train G is determined by the polarity of the d.c. control voltage. If the d.c. control voltage is positive, the pulses in the train G occur during the positive excursion or first half of each cycle of the sinusoidal wave A. If the d.c. control voltage is negative, the pulses in the train G occur during the negative excursion or second half of each cycle of the sinusoidal voltage A. Thus the wave train G consists of a series of polarity-indicative pulses.

The pulses in the wave train G are passed through an inverting gate 51 so as to produce a complementary wave train $\overline{G}$.

As will be shown, the wave trains F and G and their complements $\overline{F}$ and $\overline{G}$ may be combined to provide the desired steering function in the circuit 21.

The pulse train from the modulating circuit 19 is applied to three steering circuit output NOR gates 53, 55 and 57.

When a negative d.c. control voltage is applied to the circuit, simultaneous pulses appear in the F and G wave trains during the second half of each cycle of the sinusoidal wave A. These pulses are applied to the output NOR gate 53 through a NOR gate 59. Under the same conditions, simultaneous complementary pulses appear in the $\overline{F}$ and $\overline{G}$ wave trains during the first half of each cycle of the wave train A. These are applied to the gate 53 through a NOR gate 61.

Thus it can be seen that the output NOR gate 53 will pass variable duration d.c. voltage pulses from the circuit 19 during both half-cycles of the wave train A.

The output NOR gate 55 is connected to receive pulses in the $\overline{F}$ and $\overline{G}$ wave trains. But pulses in these trains do not occur simultaneously during the operation of a negative control voltage, so the gate 55 cannot pass variable duration d.c. voltage pulses under these conditions. Similarly, the gate 57 is connected to receive pulses in the G and $\overline{F}$ wave trains under these conditions, but pulses in these trains do not occur simultaneously for negative control voltages.

For positive control voltages, pulses occur simultaneously in the $\overline{F}$ and G wave train during the first half of each cycle of the sinusoidal wave A. Only gate 57 is connected to receive pulses in this combination of wave trains. Therefore, only gate 57 will pass variable duration d.c. voltage pulses during the first half-cycle of the sinusoidal wave in response to a positive control voltage. During the second half of the sinusoidal wave, simultaneous pulses occur in the F and $\overline{G}$ wave trains. Only gate 55 is connected to receive pulses in this combination of trains. Therefore, only gate 55 will pass variable duration d.c. voltage pulses under these conditions.

In summary, a negative d.c. control voltage will cause gate 53 to be enabled during both half-cycles of the sinusoidal wave from the a.c. source so that all variable duration d.c. voltage pulses will be applied to the bridge circuit 15 through the gate 53. On the other hand, a positive d.c. control voltage will cause the gates 55 and 57 to be alternately enabled during successive half-cycles of a sinusoidal wave so that successive variable duration d.c. voltage pulses are applied to the bridge network 15 alternately through the gates 55 and 57.

The signals from the output NOR gates 53, 55 and 57 are applied to the bridge network 15 through driver transistors 63, 65 and 67 respectively.

Energy from the a.c. source 13 is coupled to the bridge network through a center trapped transformer 69. One terminal of the torque motor 11 is connected to the center tap of the transformer secondary whereas the other terminal of the torque motor is connected through a transistor 71 and a series resistor 73 to ground.

One end of the transformer secondary, 75, is connected through a transistor 77 to the ungrounded side of the resistor 73. The transistor 77 is actuated by pulses from the steering circuit output NOR gate 55.

The remaining end of the transformer secondary, 79, is connected through a transistor 81 to the ungrounded end of the resistor 73. The transistor 81 is actuated in response to variable duration d.c. voltage pulses from the steering circuit output NOR gate 57. The first end of the transformer secondary winding, 75, is coupled to ground through a first diode 83, whereas the second end of the transformer secondary, 79, is coupled to ground through a second diode 85. The second terminal of the torque motor 11 is coupled to ground through a common diode 87.

When a positive d.c. control signal is applied to the circuit, the steering circuit output NOR gate 55 is enabled during the first half of the sinusoidal wave so as to permit a variable duration d.c. voltage pulse to actuate the transistor 77. The transformer is phased so that during this time, the end of the transformer secondary windings 75 is driven positive thus permitting current to flow through the transistor 77, the resistor 73, thence through the common diode 87 and upward through the motor 11 to the center tap of the transformer. During the next half-cycle, point 79 on the transformer secondary goes positive, and the transistor 81 becomes conductive in response to the occurrence of a variable duration d.c. voltage pulse from the steering circuit output NOR gate 57. Current now flows from point 79, through the transistor 81, the resistor 73, the commond diode 87 and upward through the motor 11 to the center tap of the transformer secondary. Since this action occurs in response to a positive d.c. control signal, it is convenient to consider current flow upward through the motor as causing a forward rotation of the motor and the transistors 77 and 81 as "forward" transistors.

When a negative d.c. control signal is applied to the circuit, the steering circuit output NOR gate 53 is enabled for both halves of the sinusoidal wave A so that all variable duration d.c. voltage pulses are applied to the transistor 71. During the first half-cycle, point 79 on the transformer secondary goes negative. During the occurrence of a variable duration d.c. voltage pulse, current flows downward through the motor 11, through the transistor 71, the resistor 73 and the diode 85 back to the point 79. On the next half-cycle, the point 75 on the transformer secondary goes negative. During the occurrence of a variable duration d.c. voltage pulse, current flows downward through the motor 11, through the transistor 71, the resistor 73, the diode 83 and back to the point 75. Thus under these conditions, the current flow through the motor is reversed so that the resultant motion may be considered reverse motion and the transistor 71 may be considered as a "reverse" transistor.

It will be recalled that the width of the variable duration d.c. voltage pulses is a function of the displacement of the two offset waves $B_1$ and $B_2$ and that the amount of offset experienced by these two waves is a function of the magnitude of the d.c. control signal. It will also be recalled that the variable duration d.c. voltage pulses are synchronized with the sinusoidal wave A so that the pulses are disposed symmetrically with respect to each peak of the sinusoid.

As has been mentioned previously, the variable duration d.c. voltage pulses drive the transistors in the bridge circuit 15 into saturation so that voltage is applied across the load throughout the occurrence of each variable duration pulse. It will be appreciated that the instantaneous value of the voltage applied across the load is determined by the instantaneous value of the voltage wave A, as can be visualized by referring to the shaded portion of curve A in FIG. 2.

Furthermore, the average power delivered to the load throughout a given half-cycle of the wave A is proportional to the area of the shaded portion.

Reference to FIG. 2 further reveals that the change of pulse width in wave train E is relatively small for small displacements of the offset wave $B_1$ and $B_2$, but that this change increases as the displacement of the waves $B_1$ and $B_2$ increases, as a result of the sinusoidal nature of these waves.

On the other hand, the height of the shaded portions of curve A varies as a cosine function. It can be shown mathematically that these two factors combine so that the change in area of the shaded portion as a function of the displacement of the offset waves $B_1$ and $B_2$, and therefore the d.c. control signal is strictly proportional to the magnitude of the control signal.

Thus the drive circuit of the present invention provides a means for precisely controlling the output torque of the motor 11.

Furthermore, the invention proves valuable in small electronic assemblies where it is necessary to have the electronics circuit drive large d.c. torque motors. In such situations, it is important to have a driver stage that is very efficient and linear in order to prevent wasted power from overheating other components so as to necessitate additional cooling facilities. The circuit of the present invention approaches efficiencies of 95% and is essentially 100% linear. In aircraft and marine installations, the available a.c. power can be used to drive the torque motor without the necessity of providing additional direct current power supplies.

Although the invention has been described with respect to a d.c. torque motor, it will be appreciated that the circuit may be used to drive other d.c. loads where precise control is necessary.

Furthermore, although the circuit has been described as one in which NOR logic is employed, it will be appreciated by those skilled in the art that other equivalent logic systems may be employed if desired.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for driving a d.c. load from a sinusoidal a.c. source in accordance with a d.c. control signal comprising:

a transformer for coupling energy from said a.c. source to the load;

pulse width modulating means including means to produce a sinusoidal signal in quadrature with a signal from said a.c. source, means to produce first and second offset signals equal to the instantaneous sum and difference, respectively, of said quadrature and said d.c. control signals, means to produce a variable duration d.c. voltage when and only when said first and second offset signals are of opposite polarity with respect to the zero axis of said quadrature signal;

switching means including forward and reverse transistor means connected to pass energizing current from said transformer through said load in forward and reverse directions, respectively; and steering means for applying said variable duration d.c. voltages to said forward transistor means in response to a d.c. control signal of one polarity and to said reverse transistor means in response to a d.c. control signal of the opposite polarity;

said forward and reverse transistor means being constructed and arranged to saturate throughout the occurrence of an applied variable duration d.c. voltage.

2. The apparatus of claim 1 wherein the means to produce first and second offset signals includes means to produce a pair of opposite polarity signals, each having an absolute magnitude proportional to the magnitude of an applied d.c. control signal, and first and second summing means to add the instantaneous value of the quadrature signal to each of the opposite polarity signals so as to produce said first and second offset signals.

3. The apparatus of claim 2 wherein the pulse width modulating means includes a polarity-responsive wave-squaring means for producing a first gating voltage whenever the first of said offset signals has a given polarity, a second gating voltage whenever the second of said offset signals has the opposite polarity, and NOR gating means to produce a variable duration d.c. voltage during the absence of both gating voltages.

4. The apparatus of claim 3 in which the secondary winding of said transformer includes a center tap to which one terminal of the load may be connected and wherein said forward transitor means includes first and second individual transistors arranged to couple energy from the respective outer ends of the secondary winding through a common diode to the second terminal of the load, and wherein said second transistor means includes a third individual transistor arranged to couple energy from a second terminal of the load through individual diodes to the respective outer ends of said secondary winding.

5. The apparatus of claim 4 wherein the steering means includes modulating means responsive to said d.c. control signal and to a signal from said a.c. source for producing a first pulse train in which each pulse occurs throughout each interval in which the instantaneous polarities of the a.c. signal and the d.c. control signal are the same, means for forming a second pulse train consisting of a series of rectangular pulses, each existing throughout the second half of a cycle of the a.c. source signal, means for forming third and fourth pulse trains complementary to said first and second pulse trains, respectively, first, second and third output NOR gates for selectively applying said variable duration d.c. voltages to said first, second and third individual transistors, respectively, in response to pulses in said wave trains, said first NOR gate being arranged to be enabled by simultaneous pulses in said first and fourth pulse trains, said second NOR gate being arranged to be enabled by simultaneous pulses in said second and third pulse trains, said third NOR gate being arranged to be enabled by simultaneous pulses in said first and second or said third and fourth pulse trains.

6. The apparatus of claim 1 in which the load to be driven is a d.c. torque motor and the d.c. control signal is derived from a variable resistance vertical reference sensor.

* * * * *